United States Patent
Kiss

(10) Patent No.: US 10,542,452 B2
(45) Date of Patent: Jan. 21, 2020

(54) ENHANCING QUALITY OF SERVICE FOR HIGH PRIORITY SERVICES

(71) Applicant: Apple Inc., Cupertino, CA (US)

(72) Inventor: Krisztian Kiss, Hayward, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/668,366

(22) Filed: Mar. 25, 2015

(65) Prior Publication Data

US 2015/0358853 A1 Dec. 10, 2015

Related U.S. Application Data

(60) Provisional application No. 62/010,200, filed on Jun. 10, 2014.

(51) Int. Cl.
*H04W 28/02* (2009.01)
*H04W 72/08* (2009.01)
(Continued)

(52) U.S. Cl.
CPC ... *H04W 28/0268* (2013.01); *H04W 28/0263* (2013.01); *H04W 72/087* (2013.01); *H04W 80/04* (2013.01); *H04L 65/1016* (2013.01)

(58) Field of Classification Search
CPC .. H04L 1/00; H04L 65/1016; H04W 28/0268; H04W 80/04; H04W 28/0252; H04W 72/082; H04W 28/0263
See application file for complete search history.

(56) References Cited

U.S. PATENT DOCUMENTS 7,680,478 B2   3/2010   Willars et al.
8,131,273 B2   3/2012   Lee et al.
(Continued)

FOREIGN PATENT DOCUMENTS

CN   101047950 A   10/2007
CN   101577888 A   11/2009
(Continued)

OTHER PUBLICATIONS

Written Opinion, International Application No. PCT/US2015/023910, dated Jul. 15, 2015, 5 pages.
(Continued)

*Primary Examiner* — Khaled M Kassim
*Assistant Examiner* — Syed Ali
(74) *Attorney, Agent, or Firm* — Kowert Hood Munyon Rankin and Goetzel PC; Jeffrey C. Hood

(57) ABSTRACT

Quality of service may be enhanced for high priority traffic. A UE may communicate within a packet switched system, e.g., an LTE network. The UE may use a first or default bearer for signaling messages of high priority services and a second bearer for messages of low priority services. For example, the first bearer may have a quality of service class identifier (QCI) value of 5 while the second bearer may have a QCI value other than 5, (e.g., 6-9). The first bearer may be used for signaling messages associated with voice over IP, video over IP, and/or SMS over IP, as desired. The second bearer may be used for messages (e.g., signaling messages) associated with other, lower priority services. For example, the second bearer may be used for presence messages or instant messages or other lower priority messages.

20 Claims, 6 Drawing Sheets

(51) Int. Cl.
*H04W 80/04* (2009.01)
*H04L 29/06* (2006.01)

(56) References Cited

U.S. PATENT DOCUMENTS

| | | | | |
|---|---|---|---|---|
| 9,191,265 | B1* | 11/2015 | McGinn | H04W 24/02 |
| 2007/0259673 | A1* | 11/2007 | Willars | H04W 52/0225 |
| | | | | 455/453 |
| 2008/0039032 | A1 | 2/2008 | Haumont | |
| 2008/0123527 | A1 | 5/2008 | Shahidi et al. | |
| 2009/0304015 | A1* | 12/2009 | Willars | H04L 47/803 |
| | | | | 370/412 |
| 2010/0128645 | A1 | 5/2010 | Lin et al. | |
| 2012/0276904 | A1* | 11/2012 | Bachmann | H04W 76/27 |
| | | | | 455/436 |
| 2013/0121206 | A1* | 5/2013 | Turanyi | H04L 47/782 |
| | | | | 370/254 |
| 2013/0318345 | A1 | 11/2013 | Hangeveld | |
| 2014/0286222 | A1* | 9/2014 | Yu | H04W 4/08 |
| | | | | 370/312 |
| 2015/0215840 | A1* | 7/2015 | Yiu | H04W 40/02 |
| | | | | 370/329 |
| 2015/0257159 | A1* | 9/2015 | Speicher | H04W 28/0268 |
| | | | | 370/235 |
| 2015/0271087 | A1* | 9/2015 | Yiu | H04L 47/35 |
| | | | | 370/230 |
| 2015/0341824 | A1* | 11/2015 | Ge | H04W 48/02 |
| | | | | 370/230 |
| 2015/0350962 | A1* | 12/2015 | Futaki | H04B 7/024 |
| | | | | 370/331 |
| 2015/0351138 | A1* | 12/2015 | Metsala | H04W 76/02 |
| | | | | 370/254 |
| 2016/0191363 | A1* | 6/2016 | Haraszti | H04L 41/0896 |
| | | | | 709/223 |
| 2016/0191631 | A1* | 6/2016 | Haraszti | H04L 67/14 |
| | | | | 709/227 |
| 2016/0227467 | A1* | 8/2016 | Tomici | H04W 48/16 |
| 2016/0360556 | A1* | 12/2016 | Jeong | H04W 76/10 |
| 2017/0034749 | A1* | 2/2017 | Chandramouli | H04W 4/90 |
| 2017/0055314 | A1* | 2/2017 | Cha | H04W 76/38 |
| 2018/0184336 | A1* | 6/2018 | Keller | H04W 4/24 |
| 2018/0368026 | A1* | 12/2018 | Tomici | H04W 8/04 |

FOREIGN PATENT DOCUMENTS

| | | |
|---|---|---|
| CN | 102457477 A | 5/2012 |
| WO | 2013123467 A1 | 8/2013 |

OTHER PUBLICATIONS

Search Report, International Application No. PCT/US2015/023910, dated Jul. 15, 2015, 4 pages.
Taiwan Office Action, Application No. 104112266, dated Mar. 22, 2016, 12 pages.
First Office Action, Chinese Application for Invention No. 201580022480.4, dated Feb. 19, 2019, 12 pages.
Office Action, Chinese Application for Invention No. 201580022480.4, dated Jul. 2, 2019, 24 pages.

* cited by examiner

| QCI | Resource Type | Priority | Packet Delay Budget | Packet Error Loss Rate | Example Services |
|---|---|---|---|---|---|
| 1 | GBR | 2 | 100ms | $10^{-2}$ | Conversational Voice |
| 2 | GBR | 4 | 150ms | $10^{-3}$ | Conversational Video (LiveStreaming) |
| 3 | GBR | 3 | 50ms | $10^{-3}$ | Real Time Gaming |
| 4 | GBR | 5 | 300ms | $10^{-6}$ | Non-Conversational Video (Buffered Streaming) |
| 5 | Non-GBR | 1 | 100ms | $10^{-6}$ | IMS Signaling |
| 6 | Non-GBR | 6 | 300ms | $10^{-6}$ | Video (Buffered Streaming) TCP-based (e.g., www, e-mail, chat, ftp, p2p file sharing, progressive video, etc.) |
| 7 | Non-GBR | 7 | 100ms | $10^{-3}$ | Voice, Video (Live Streaming) Interactive Gaming |
| 8 | Non-GBR | 8 | 300ms | $10^{-6}$ | Video (Buffered Streaming) TCP-based (e.g., www, e-mail, chat, ftp, p2p file sharing, progressive video, etc.) |
| 9 | Non-GBR | 9 | | | |

*FIG. 6*

ENHANCING QUALITY OF SERVICE FOR HIGH PRIORITY SERVICES

PRIORITY

This application claims benefit of priority of U.S. provisional application Ser. No. 62/010,200 titled "Enhancing Quality of Service for High Priority Services" filed Jun. 10, 2014, whose inventor was Krisztian Kiss, which is hereby incorporated by reference in its entirety as though fully and completely set forth herein.

FIELD

The present application relates to the field of wireless communication, and more particularly to a system and method for enhancing quality of service for high priority services.

DESCRIPTION OF THE RELATED ART

Wireless communication systems are rapidly growing in usage. Further, wireless communication technology has evolved from voice-only communications to also include the transmission of data, such as Internet and multimedia content. As wireless communication systems evolve, successive generations of wireless communication technologies tend to be developed. Adoption of a new generation wireless technology may be a gradual process, during which one or more previous generations of a similar technology may co-exist with the new generation technology, e.g., for a period of time until the new generation wireless technology is fully deployed.

As one example, wireless technologies are increasingly using packet switched connections for performing voice and video communication between users, e.g., using VoLTE (Voice over LTE (Long Term Evolution)) or video over LTE. Because of this addition of high priority data traffic, ensuring sufficient quality of service for these services is increasingly important.

SUMMARY

Embodiments described herein relate to a method for enhancing quality of service for high priority traffic. For example, a UE may communicate within a packet switched system, e.g., an LTE network. The UE may be configured to implement various IP services or applications, such as voice over IP (e.g., VoLTE) or video over IP (e.g., video over LTE), among other possibilities (e.g., SMS over IP). Signaling messages associated with these services may be communicated using a first or default bearer, which may be associated with messages or services of higher importance. The UE may also implement other IP services or applications having lower importance, such as a SIP instant messaging service, SIP presence service, or other lower priority services. Messages associated with these services may be communicated using a second bearer.

The first and second bearers may have different quality of service (QoS) requirements or characteristics. For example, the first bearer may have a higher QoS requirements and the second bearer may have lower QoS requirements. In one embodiment, different QoS class identifier (QCI) values may be used to establish or otherwise associated with the two bearers. For example, the first bearer may have a QCI value of 5 (which may have a high or highest priority) while the second bearer may have a QCI value other than 5, such as 6-9 (which may have a lower priority).

The UE may use the first and second bearers for signaling messages according to the importance or categorization of the messages or services associated with the messages. For example, VoLTE signaling messages related to session setup or SMS over IP messages may be sent using the first bearer while messages related to SIP presence or SIP instant messaging may be sent using the second bearer.

This Summary is provided for purposes of summarizing some exemplary embodiments to provide a basic understanding of aspects of the subject matter described herein. Accordingly, the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the preferred embodiment is considered in conjunction with the following drawings, in which:

FIG. 6 is an example table illustrating characteristics of quality of service class identifiers, according to one embodiment.

Figure 1:
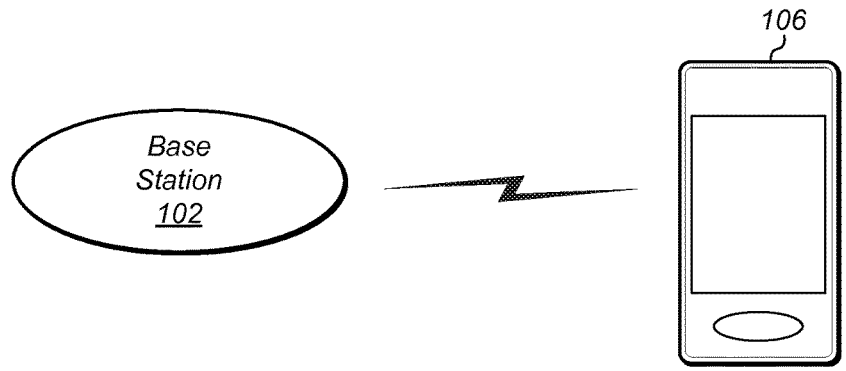
FIG. 1 illustrates an exemplary wireless communication system, according to one embodiment.

While the features described herein are susceptible to various modifications and alternative forms, specific embodiments thereof are shown by way of example in the drawings and are herein described in detail. It should be understood, however, that the drawings and detailed description are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.
3GPP: Third Generation Partnership Project
3GPP2: Third Generation Partnership Project 2
GSM: Global System for Mobile Communications
UMTS: Universal Mobile Telecommunications System
LTE: Long Term Evolution

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, other handheld devices, as well as wearable devices such as wrist-watches, headphones, pendants, earpieces, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
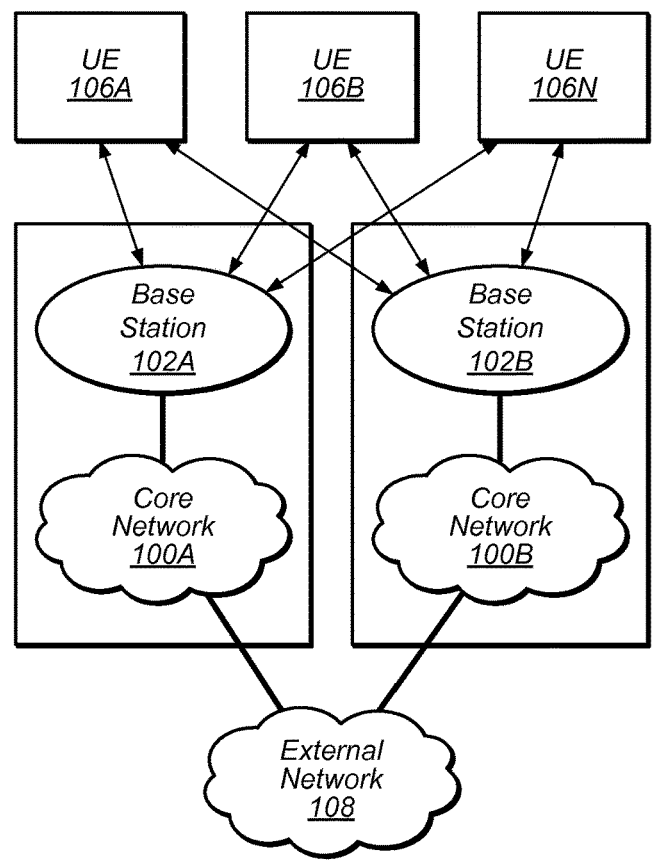
FIG. 2 illustrates a base station in communication with a user equipment device, according to one embodiment.
Figure 3:
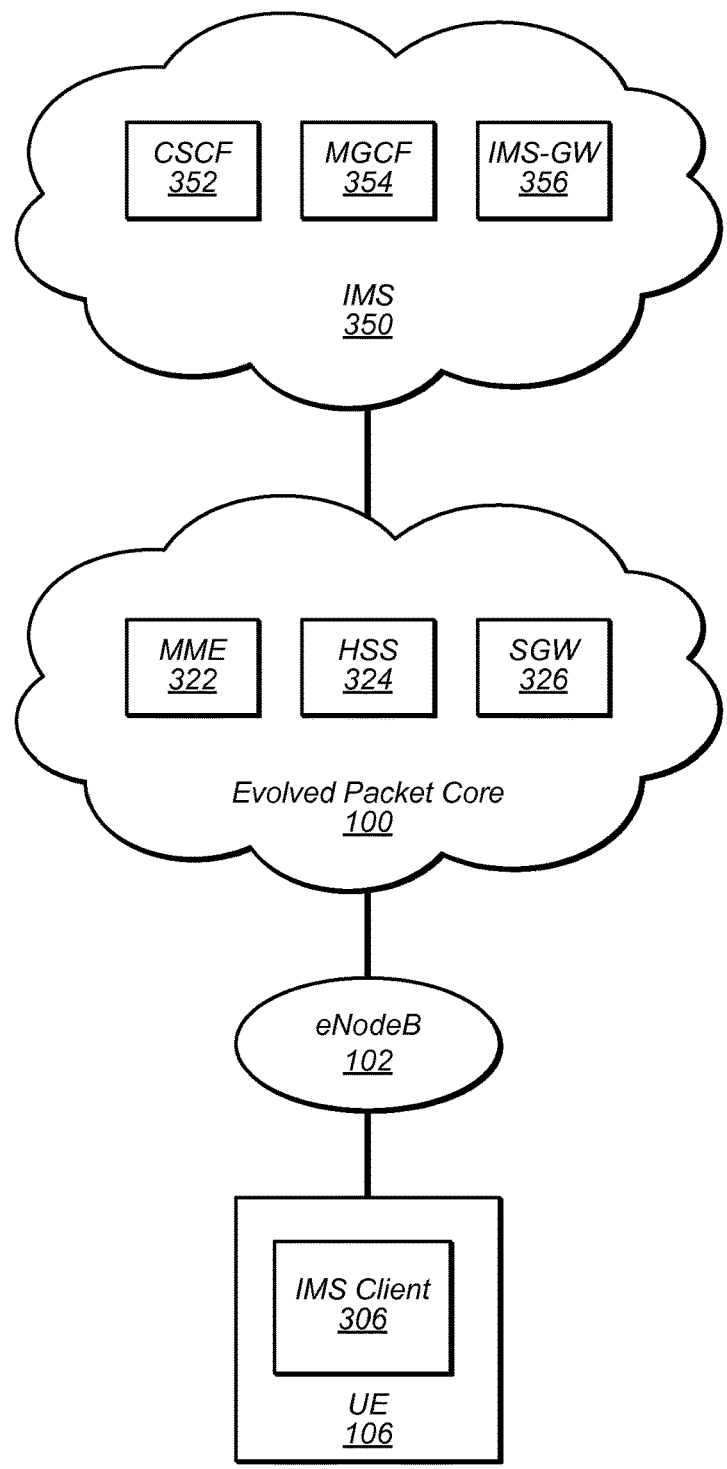
FIG. 3 illustrates a user equipment device in communication with a network via a base station, according to one embodiment.

FIGS. 1-3—Communication System

FIG. 1 illustrates a simplified communication system where a user equipment (UE) 106 is in communication with a base station 102. The UE 106 may be a device with wireless network connectivity such as a mobile phone, a hand-held device, a computer or a tablet, or virtually any type of wireless device. FIG. 2 illustrates an expanded wireless communication system involving multiple UEs 106A-N, base stations 102A and 102B, core networks 100A and 100B, and an external network 108. However, it should be noted that the system of FIG. 2 is merely one example of a possible system, and embodiments may be implemented in any of various systems, as desired.

The base stations 102 may be base transceiver stations (BTS) and/or cell sites, and may include hardware that enables wireless communication with the UEs 106. As shown in FIG. 2, each base station 102 may also be equipped to communicate with a core network 100 (e.g., base station 102A may be coupled to core network 100A, while base station 102B may be coupled to core network 100B), which may be a core network of a cellular service provider. Each core network 100 may also be coupled to one or more external networks (such as external network 108), which may include the Internet, a Public Switched Telephone Network (PSTN), and/or any other network, as desired. Thus, the base stations 102 may facilitate communication between the user devices 106 and/or between the user devices 106 and the networks 100A, 100B, and 108.

The base stations 102 and the user devices 106 may be configured to communicate over the transmission medium using any of various radio access technologies ("RATs", also referred to as wireless communication technologies) or telecommunication standards such as GSM, UMTS (WCDMA), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), etc.

Base station 102A and core network 100A may operate according to a first RAT (e.g., LTE) while base station 102B and core network 100B operate according to a second (e.g., different) RAT (e.g., CDMA 2000 or GSM, among other possibilities). The two networks may be controlled by the same network operator (e.g., cellular service provider or "carrier"), or by different network operators, as desired. In addition, the two networks may be operated independently of one another (e.g., if they operate according to different cellular communication standards), or may be operated in a somewhat coupled or tightly coupled manner.

Note also that while two different networks may be used to support two different cellular communication technologies, such as illustrated in the exemplary network configuration shown in FIG. 2, other network configurations implementing multiple cellular communication technologies are also possible. As one example, base stations 102A and 102B might operate according to different cellular communication technologies but couple to the same core network. As another example, multi-mode base stations capable of simultaneously supporting different cellular communication technologies (e.g., LTE and CDMA2000 1×RTT, LTE and GSM, and/or any other combination of cellular communication technologies) might be coupled to a core network that also supports the different cellular communication technologies.

The UE 106 may include a processor that is configured to execute program instructions stored in memory. The UE 106 may perform any of the method embodiments described herein by executing such stored instructions. The UE 106 may also or alternatively include a programmable hardware element such as an FPGA (field-programmable gate array) that is configured to perform any of the method embodiments described herein, or any portion of any of the method embodiments described herein.

In some embodiments, the UE 106 may be configured to communicate using any of multiple wireless communication standards (e.g., 3GPP, 3GPP2, etc.) or multiple RATs. For example, the UE 106 may be configured to communicate using two or more of GSM, CDMA2000, LTE, LTE-A, HSPA, WLAN, or GNSS, among other possibilities. In one embodiment, a UE 106 may be configured to use a first RAT that is a packet-switched technology (e.g., LTE) and a second RAT that is a circuit-switched technology (e.g., GSM or 1×RTT) while communicating with the base stations 102. Other combinations of RATs are also possible. The UE 106 might also or alternatively be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc.

The UE 106 may include one or more antennas for communicating using the RAT(s). In one embodiment, the UE 106 may share one or more parts of a receive and/or transmit chain between multiple RATs; for example, the UE 106 might be configured to communicate using either of CDMA2000 (1×RTT/1×EV-DO/HRPD/eHRPD) or LTE and/or GSM or LTE, e.g., using a single shared radio. The shared radio may include a single antenna, or may include multiple antennas (e.g., for MIMO) for performing wireless communications. Alternatively, the UE 106 may include separate transmit and/or receive chains (e.g., including separate antennas and other radio components) for each RAT with which it is configured to communicate. As a further possibility, the UE 106 may include one or more radios which are shared between multiple RATs, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

FIG. 3 illustrates an exemplary, simplified portion of a wireless communication system that may be particularly useful for implementing voice or video over IP communication, such as voice over LTE (VoLTE) in an LTE network. As shown, the UE 106 may include an IP multimedia subsystem (IMS) client 306, e.g., which may be implemented in various manners, using hardware and/or software. For example, in one embodiment, software and/or hardware may implement an IMS stack that may provide desired IMS functionalities, e.g., including registration, AKA authentication with IPSec support, session setup and resource reservations, etc.

The UE 106 may be in communication with a base station, shown in this exemplary embodiment as an eNodeB 102. In turn, the eNodeB may be coupled to a core network, shown in this exemplary embodiment as an evolved packet core (EPC) 100. As shown, the EPC 100 may include mobility management entity (MME) 322, home subscriber server (HSS) 324, and serving gateway (SGW) 326. The EPC 100 may include various other devices known to those skilled in the art as well.

The EPC 100 may be in communication with the IMS 350. The IMS 350 may include call session control function (CSCF) 352, which may itself include a proxy CSCF (P-CSCF), interrogating CSCF (I-CSCF), and serving CSCF (S-CSCF), as desired. The IMS 350 may also include media gateway controller function (MGCF) 354 and IMS management gateway (IMS-MGW) 356. Similar to the EPC 100, the IMS 350 may include various other devices known to those skilled in the art as well.

Thus, the system of FIG. 3 illustrates an exemplary portion of the data pathway that may be used for voice or video over IP communication, e.g., VoLTE.

Figure 4:
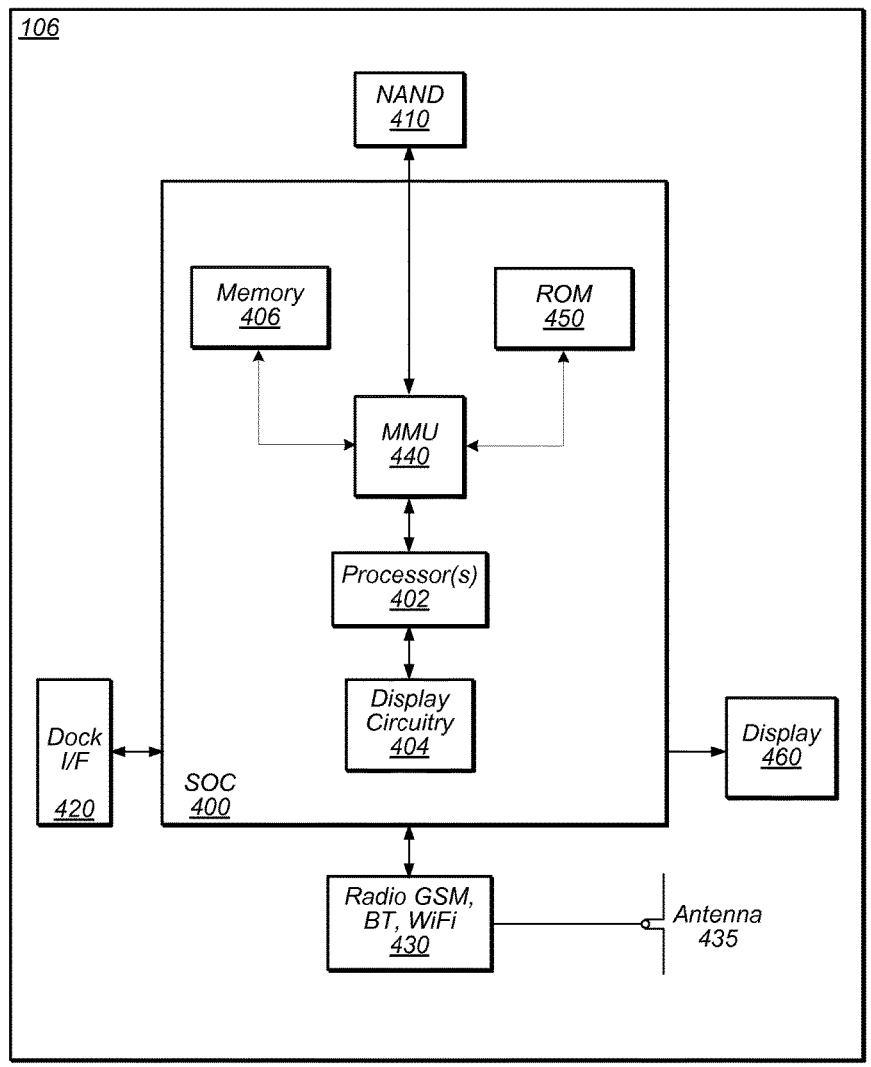
FIG. 4 is an example block diagram of a user equipment device, according to one embodiment.

FIG. 4—Exemplary Block Diagram of a UE

FIG. 4 illustrates an exemplary block diagram of a UE 106. As shown, the UE 106 may include a system on chip (SOC) 400, which may include portions for various purposes. For example, as shown, the SOC 400 may include processor(s) 402 which may execute program instructions for the UE 106 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, wireless communication circuitry 430 (also referred to as a "radio"), connector I/F 420, and/or display 460. The MMU 440 may be configured to perform memory protection and page table translation or set up. In some embodiments, the MMU 440 may be included as a portion of the processor(s) 402.

As also shown, the SOC 400 may be coupled to various other circuits of the UE 106. For example, the UE 106 may include various types of memory (e.g., including NAND flash 410), a connector interface 420 (e.g., for coupling to a computer system, dock, charging station, etc.), the display 460, and wireless communication circuitry 430 (e.g., for LTE, CDMA2000, Bluetooth, WiFi, etc.).

As noted above, the UE 106 may be configured to communicate wirelessly using multiple wireless communication technologies. As further noted above, in such instances, the wireless communication circuitry (radio(s)) 430 may include radio components which are shared between multiple wireless communication technologies and/or radio components which are configured exclusively for use according to a single wireless communication technology. As shown, the UE device 106 may include at least one antenna 435 (and possibly multiple antennas, e.g., for MIMO and/or for implementing different wireless communication technologies, among various possibilities), for performing wireless communication with cellular base stations and/or other devices. For example, the UE device 106 may use antenna 435 to perform the wireless communication.

As described herein, the UE 106 may include hardware and software components for implementing features for communicating using one or more wireless communication technologies, such as those described herein. The processor 402 of the UE device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the UE device 106, in conjunction with one or more of the other components 400, 404, 406, 410, 420, 430, 435, 440, 450, 460 may be configured to implement part or all of the features described herein.

Figure 5:
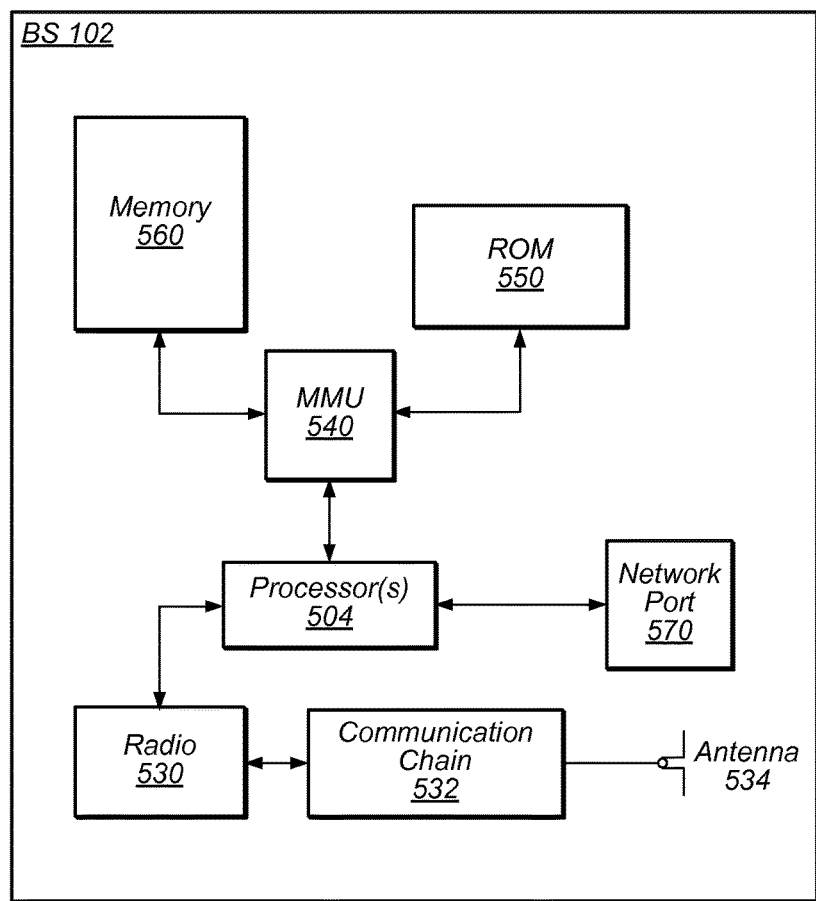
FIG. 5 is an example block diagram of a base station, according to one embodiment.

FIG. 5—Base Station

FIG. 5 illustrates an exemplary block diagram of a base station 102. It is noted that the base station of FIG. 5 is merely one example of a possible base station. As shown, the base station 102 may include processor(s) 504 which may execute program instructions for the base station 102. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The base station 102 may include at least one network port 570. The network port 570 may be configured to couple to a telephone network and provide a plurality of devices, such as UE devices 106 (see FIG. 3), access to the telephone network as described above.

The network port 570 (or an additional network port) may also or alternatively be configured to couple to a cellular network, e.g., a core network of a cellular service provider. The core network may provide mobility related services and/or other services to a plurality of devices, such as UE devices 106. In some cases, the network port 570 may couple to a telephone network via the core network, and/or the core network may provide a telephone network (e.g., among other UE devices serviced by the cellular service provider).

The base station 102 may include at least one antenna 534. The at least one antenna 534 may be configured to operate as a wireless transceiver and may be further configured to communicate with UE devices 106 via radio 530. The antenna 534 communicates with the radio 530 via communication chain 532. Communication chain 532 may be a receive chain, a transmit chain or both. The radio 530 may be configured to communicate via various wireless communication technologies, including, but not limited to, LTE, GSM, WCDMA, CDMA2000, etc.

The processor(s) 504 of the base station 102 may be configured to implement part or all of the methods described herein, e.g., by executing program instructions stored on a memory medium (e.g., a non-transitory computer-readable memory medium). Alternatively, the processor 504 may be configured as a programmable hardware element, such as an FPGA (Field Programmable Gate Array), or as an ASIC (Application Specific Integrated Circuit), or a combination thereof.

Enhancing Quality of Service for High Priority Traffic

In order to provide consistent quality of service (QoS) across multiple environments, some wireless standards have implemented quality of service class identifier (QCI) values. In particular, these QCI values may be used to ensure that applications and/or services mapped to a QCI value receive at least the same minimum level of QoS across different environments (e.g., in multi-vendor network deployments, in case of roaming, etc.).

FIG. 6 illustrates an exemplary table of QCI values and corresponding QoS characteristics associated with those values. As shown, the table of FIG. 6 illustrates QCI values from 1-9, each being associated with different a resource type (e.g., guaranteed bit rate (GBR) or non-GBR), a priority (where a lower numerical value indicates a higher priority, and thus a higher level of QoS), a packet delay budget, a packet error loss rate, and example services. For example, a QCI value of 1 may be used for conversational voice and has a priority of 2, a guaranteed bit rate, a 100 ms packet delay budget, and a packet error loss rate of $10^{-2}$. For IMS signaling, a QCI value of 5 may be used, which has a priority of 1 (highest priority in the table), a non guaranteed bit rate, a packet delay budget of 100 ms, and a packet error loss rate of $10^{-6}$. Other QCI values are associated with services such as conversational video (live streaming), real time gaming, non-conversational video, etc., as shown in FIG. 6.

Although a QCI value of 5 may generally be associated with "IMS signaling", e.g., as specified in GSMA IR.92 (related to VoLTE and as shown in FIG. 6, having the highest priority), details for IMS signaling are not presently specified, e.g., within 3GPP TS 23.203. For example, the QCI value of 5 is not restricted to "important" or "urgent" IMS signaling, e.g., for signaling associated with establishing and/or maintaining voice over IP or video communication over IP, such as VoLTE or video over LTE. As a result, the QCI value of 5 may be used for non-important or non-urgent IMS communications, which is undesirable.

Moreover, the SIP protocol is the main building block of IMS signaling. As a result, IMS signaling may carry non-critical user data (e.g., SIP presence updates or SIP instant messages) mixed with more important session setup signaling, such as those associated with VoLTE. Accordingly, critical IMS signaling may be heavily loaded by this less critical IMS signaling, which can result in the critical IMS signaling experiencing additional latency and/or jitter due to the less critical IMS signaling. Specifically, this loading of critical IMS signaling may lead to undesirable latency for higher priority traffic, such as VoLTE signaling. Even further, the overloading of the higher priority IMS signaling could also lead to undesirable latency for high priority traffic that is of lower priority than the IMS signaling, such as VoLTE.

In one embodiment, rather than using a single bearer (associated with a single QCI) for all IMS signaling, services or applications may be divided into two or more different categories or groups. For example, a first category may be used for higher priority signals or messages of services or applications, which may include signaling associated with establishing or maintaining VoLTE, Video over LTE, or other similar applications or services that are deemed important or higher priority. In one embodiment, messages associated with SMS-over-IP may be included in the first category, e.g., if the SMS-over-IP service is considered a higher priority service or application. A second category may be used for lower priority messages of applications or services, which may include SIP presence messages (e.g., based on SUBSCRIBE/NOTIFY methods, such as specified in IETF RFC 6665 or RFC 3856), SIP instant messaging (e.g., based on the SIP MESSAGE method, such as specified in IETF RFC 3482), or other non-critical service messages (e.g., based on the SIP event notification framework, such as SUBSCRIBE/NOTIFY methods, such as specified in IETF RFC 6665), among other possibilities.

In one embodiment, the first category of signaling messages may use a first bearer (e.g., an EPS bearer) having a QCI value of 5 and the second category of services may use a second bearer (e.g., an EPS bearer) having a QCI value other than 5 that is associated with non-guaranteed bit rate services (e.g., 6-9). For example, messages associated with signaling for VoLTE, Video over LTE, and/or SMS-over IP may use the first bearer while SIP presence messages or SIP instant messaging (among other possibilities) may use the second bearer. The latency and/or jitter for high priority services such as VoLTE, Video over LTE, and/or SMS over IP can be reduced because the messages using the second bearer are of lower priority than the messages using the first bearer (which in this example have a priority of 1) and/or because the messages using the second bearer are of lower priority than the high priority services themselves (which in this example have priority values of 2, 3, or 4). In this way, the QoS for high priority services, such as VoLTE, Video over LTE, and/or SMS over IP can be enhanced.

While various descriptions herein relate to services or applications being associated with bearers, the bearers may instead be associated with specific messages or types of messages. Thus, the first bearer may be used for high priority messages while the second bearer may be used for lower priority messages. While the priority of the messages may generally be based on the services or applications providing the messages, it may be possible that delineation at the message level may be desired. As one example, an application or service may use both of the bearers, e.g., for different messages. For example, if a VoLTE application makes use of a presence service to inform a user about availability of his friends, the VoLTE application may maintain or use two bearers for IMS signaling, e.g., the first bearer for VoLTE signaling (such as for call setup and termination) and the second bearer for the presence messages.

Figure 7:
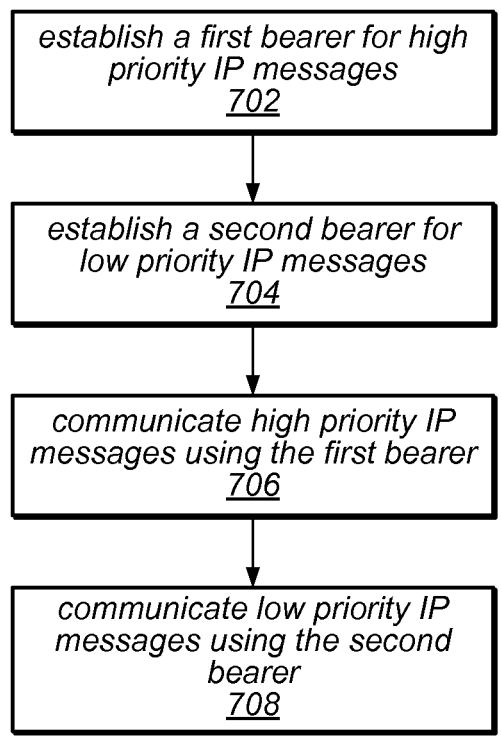
FIG. 7 is a flowchart diagram illustrating an example method for reducing traffic load for high priority traffic, according to one embodiment.

FIG. 7—Enhancing Quality of Service for High Priority Traffic

FIG. 7 is a flowchart diagram illustrating a method for enhancing quality of service for high priority traffic. The method may be implemented by a wireless UE device (such as UE 106 in FIG. 2) communicating with a network via a base station (such as base station 102 in FIG. 2). In some embodiments, the method may relate to packet switched systems (e.g., LTE) where the UE may use various voice over IP (e.g., VoLTE), video over IP, or other IP services and applications. The method shown in FIG. 7 may be used in conjunction with any of the systems or devices shown in the above Figures, among other systems or devices. In various embodiments, some of the method elements shown may be performed concurrently, in a different order than shown, or may be omitted. Note also that additional method elements may also be performed as desired. The method may be performed as follows.

In block 702, a first or default bearer may be established for the UE. For example, when the UE initially attaches to a network (e.g., with which the base station is associated) or when the UE sends a connectivity request (e.g., a PDN connectivity request, such as for VoLTE), the network may initially set up a default bearer (e.g., an EPS bearer) having high QoS characteristics or requirements (such as low latency and/or low packet error loss rate). For example, the first bearer may have a QCI value (such as 5) associated with a high priority (such as 1), e.g., in the IMS APN for IMS signaling.

In block 704, a second bearer may be established for the UE. The second bearer may be used for lower priority messages or services than the first bearer. Accordingly, the second bearer may have lower QoS requirements or characteristics than the first bearer. Thus, for example, the first bearer may be used for higher priority messages and therefore may have higher QoS requirements (e.g., associated with a QCI value of 5) while the second bearer may be used for lower priority messages and therefore may have lower QoS requirements (e.g., associated with a QCI other than 5, such as 6-9).

The first and second bearers may be dedicated to a same type of messages. For example, the first bearer may be the default IMS signaling bearer for the UE. The second bearer may also be used for IMS messages (e.g., also IMS signaling messages).

In blocks 706 and 708, the first and second bearers may be used for communicating messages (e.g., signaling messages). For example, as discussed above, the first bearer may be used for messages (e.g., IMS messages) associated with higher priority services, such as voice over IP (e.g., VoLTE) and video over IP (e.g., Video over LTE). The first bearer may also be used for messages associated with SMS-over-IP, if desired. In one embodiment, the first bearer may be particularly used for important signaling messages associated with these services, such as establishing a voice or video over IP call. The second bearer may be used for lower priority services or messages (e.g., also IMS messages), such as SIP presence messages or SIP instant messages, among other non-critical services or messages. For example, the first bearer may be used for IMS registration, session setup, and SMS-over-IP traffic, while user data mixed over IMS signaling may be offloaded to the second bearer.

While blocks 704 and 708 are shown in a particular order, other orders are also envisioned. For example, the second bearer may only be established when there is a need for it (e.g., it may be established in a dynamic fashion), such as when a lower priority service is used or a lower priority message needs to be transmitted or received. For example, the UE may execute a video over LTE service that uses the first bearer, but may not establish and/or use the second bearer until there is a need for it, e.g., when a SIP instant messaging service is executed, among other possible services or messages.

Additionally, as noted above, the two bearers may be used by a same application (although embodiments using different applications are also envisioned). For example, a VoLTE application may send messages for session setup of the VoLTE call, but may also make use of SIP presence messages to inform a user about availability of his friends (or to inform his friends of his availability). Accordingly, the session setup signaling message(s) may be communicated using the first bearer and the presence messages may be communicated using the second bearer. Of course, the two bearers may be used by different applications, as desired.

In prior art systems, a single high priority bearer was used for all IMS signaling, regardless of importance. This behavior resulted in a lot of non-urgent IMS traffic being transmitted as high priority, which detracted from the quality of service of urgent IMS signaling. By using these two bearers having different QoS requirements and different priorities as described above with reference to FIGS. 6 and 7, overloading of the default or first bearer may be avoided. In other words, the most important or most urgent traffic can be assigned or communicated with the first high priority bearer, whereas the non-urgent traffic can be assigned the second lower priority bearer. Thus high priority transmissions are reserved for the most urgent traffic, and high priority transmissions are no longer wasted on non-urgent messaging. As a result, the messages using the first bearer may enjoy lower latencies, lower loss rates, and/or better performance, which may not have been the case when the first bearer was simply used for all IMS signaling, regardless of priority or importance. This can result in lower latencies, lower loss rates, and/or better performance for high priority services such as VoLTE, Video over LTE, and/or SMS over IP due to, for example, reduced latencies for call setup. In addition, because the non-urgent messaging using the second bearer is configured to be of lower priority than the high priority services such as VoLTE, Video over LTE, and/or SMS over IP, these high priority services can also enjoy lower latencies, lower loss rates, and/or better performance.

Various Embodiments

The following paragraphs describe exemplary embodiments of the present disclosure.

One set of embodiments may include a method for operating a user equipment device (UE) communicating with a packet switched network, the method comprising: at the UE: establishing a first bearer having first quality of service (QoS) characteristics associated with a first priority; establishing a second bearer having second QoS characteristics associated with a second priority lower than the first priority, wherein the first bearer and the second bearer are used for a same type of messages; using the first bearer for communication for a first set of messages having the first priority; and using the second bearer for communication for a second set of messages having the second priority.

According to some embodiments, the preceding method further comprises, wherein the class of messages comprises IMS signaling.

According to some embodiments, the preceding method further comprises, wherein the first QoS characteristics are identified by a QoS class identifier (QCI) value of 5, wherein the second QoS characteristics are identified by a QCI value other than 5.

According to some embodiments, the preceding method further comprises, wherein the QCI value of the second QoS characteristics comprise one of 6-9.

According to some embodiments, the preceding method further comprises, wherein the first set of messages are associated with a first set of services, wherein the second set of messages are associated with a second set of services, wherein the first set of services is higher priority than the second set of services.

According to some embodiments, the preceding method further comprises, wherein the first set of messages are associated with voice over IP or video over IP signaling services.

According to some embodiments, the preceding method further comprises, wherein the first set of messages are associated with a SMS over IP service.

According to some embodiments, the preceding method further comprises, wherein the second set of messages are associated with a SIP presence service, a SIP instant messaging service, or other SIP services based on the SIP event notification framework.

According to some embodiments, the preceding method further comprises, wherein the packet switched network implements long term evolution (LTE).

According to some embodiments, the preceding method further comprises, wherein the first bearer comprises a default bearer.

According to some embodiments, the preceding method further comprises, wherein the first set of messages are associated with a service having third QoS characteristics associated with a third priority lower than the first priority and higher than the second priority.

One set of embodiments may include a user equipment device (UE), the UE comprising: a radio, comprising one or more antennas configured for wireless communication, wherein the radio is configured to communicate using at least a first radio access technology (RAT), wherein the first RAT comprises a packet switched RAT; and a processing element coupled to the radio; wherein the radio and the processing element are configured to implement embodiment(s) of the preceding method.

One set of embodiments may include a non-transitory, computer accessible memory medium storing program instructions, wherein the program instructions are executable by a processor to implement embodiment(s) of the preceding method.

One set of embodiments may include a method that includes any action or combination of actions as substantially described herein in the Detailed Description.

One set of embodiments may include a method as substantially described herein with reference to each or any combination of FIG. 1 through the last Figure or with reference to each or any combination of paragraphs in the Detailed Description.

One set of embodiments may include a wireless device configured to perform any action or combination of actions as substantially described herein in the Detailed Description.

One set of embodiments may include a wireless device that includes any component or combination of components as described herein in the Detailed Description as included in a wireless device.

One set of embodiments may include a non-volatile computer-readable medium that stores instructions that, when executed, cause the performance of any action or combination of actions as substantially described herein in the Detailed Description.

One set of embodiments may include an integrated circuit configured to perform any action or combination of actions as substantially described herein in the Detailed Description.

One set of embodiments may include a user equipment device (UE), the UE comprising: a radio, comprising one or more antennas configured for wireless communication, wherein the radio is configured to communicate using at least a first radio access technology (RAT), wherein the first RAT comprises a packet switched RAT; and a processing element coupled to the radio; wherein the radio and the processing element are configured to: establish a first bearer having first quality of service (QoS) characteristics associated with a first priority; establish a second bearer having second QoS characteristics associated with a second priority lower than the first priority, wherein the first bearer and the second bearer are both used for IP multimedia subsystem (IMS) messages; using the first bearer for communication for a first set of IMS messages having the first priority; and using the second bearer for communication for a second set of IMS messages having the second priority.

According to some embodiments, the preceding UE comprises, wherein the first set of IMS messages and the second set of IMS messages are IMS signaling messages.

According to some embodiments, the preceding UE comprises, wherein the first QoS characteristics are identified by a QoS class identifier (QCI) value of 5, wherein the second QoS characteristics are identified by a QCI value other than 5.

According to some embodiments, the preceding UE comprises, wherein the first set of IMS messages are associated with a first set of services, wherein the second set of IMS messages are associated with a second set of services, wherein the first set of services is higher priority than the second set of services.

According to some embodiments, the preceding UE comprises, wherein the first set of IMS messages are associated with voice over IP or video over IP signaling services.

According to some embodiments, the preceding UE comprises, wherein the first set of IMS messages are associated with a SMS over IP service.

According to some embodiments, the preceding UE comprises, wherein the second set of IMS messages are associated with a SIP presence service, a SIP instant messaging service, or other SIP services based on the SIP event notification framework.

According to some embodiments, the preceding UE comprises, wherein the first bearer comprises a default bearer, wherein establishing the second bearer is performed in response to the second set of IMS messages.

One set of embodiments may include a non-transitory, computer accessible memory medium storing program instructions, wherein the program instructions are executable by a processor of a user equipment device (UE) to: establishing a default bearer for IP multimedia subsystem (IMS) messages; using the default bearer for IMS messages having a first priority; in response to IMS messages of a second priority, lower than the first priority, establishing a second bearer for IMS messages; using the second bearer for the IMS messages of the second priority.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a user equipment (UE) device, a tablet computer, a wearable computer, etc.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A method for operating a user equipment device (UE) communicating with a packet switched network, the method comprising:
   at the UE:
      establishing a first bearer having first quality of service (QoS) characteristics associated with a first priority, wherein the first bearer is a dedicated IP multimedia subsystem (IMS) signaling bearer used only for IMS signaling messages, wherein the first bearer is a default IMS signaling bearer, wherein the first QoS characteristics are identified by a QoS class identifier (QCI) value of 5;
      establishing a second bearer having second QoS characteristics associated with a second priority lower than the first priority, wherein the second bearer is also a dedicated IMS signaling bearer used only for IMS signaling messages, wherein the second QoS characteristics are identified by a QCI value other than 5;
      using the first bearer for communication for a first set of messages having the first priority; and
      using the second bearer for communication for a second set of messages having the second priority.

2. The method of claim 1, wherein the first set of messages and the second set of messages are associated with a same application.

3. The method of claim 1, wherein the QCI value of the second QoS characteristics comprise one of 6-9.

4. The method of claim 1, wherein the first set of messages are associated with a first set of services, wherein the second set of messages are associated with a second set of services, wherein the first set of services is higher priority than the second set of services.

5. The method of claim 1, wherein the first set of messages are associated with voice over IP or video over IP signaling services.

6. The method of claim 1, wherein the first set of messages are associated with a SMS over IP service.

7. The method of claim 1, wherein the second set of messages are associated with a SIP presence service, a SIP instant messaging service, or other SIP services based on the SIP event notification framework.

8. The method of claim 1, wherein the packet switched network implements long term evolution (LTE).

9. The method of claim 1, wherein the first set of messages are associated with a service having third QoS characteristics associated with a third priority lower than the first priority and higher than the second priority.

10. A user equipment device (UE), the UE comprising:
a radio, comprising one or more antennas configured for wireless communication, wherein the radio is configured to communicate using at least a first radio access technology (RAT), wherein the first RAT comprises a packet switched RAT; and
a processing element coupled to the radio;
wherein the radio and the processing element are configured to:
establish a first bearer having first quality of service (QoS) characteristics associated with a first priority, wherein the first bearer is a dedicated IP multimedia subsystem (IMS) signaling bearer used only for IMS signaling messages, wherein the first bearer is a default IMS signaling bearer, wherein the first QoS characteristics are identified by a QoS class identifier (QCI) value of 5;
establish a second bearer having second QoS characteristics associated with a second priority lower than the first priority, wherein the second bearer is also a dedicated IMS signaling bearer used only for IMS signaling messages, wherein the second QoS characteristics are identified by a QCI value other than 5;
using the first bearer for communication for a first set of IMS signaling messages having the first priority; and
using the second bearer for communication for a second set of IMS signaling messages having the second priority.

11. The UE of claim 10, wherein the first set of IMS signaling messages and the second set of IMS signaling messages are associated with a same application.

12. The UE of claim 10, wherein the first set of IMS signaling messages are associated with a first set of services, wherein the second set of IMS signaling messages are associated with a second set of services, wherein the first set of services is higher priority than the second set of services.

13. The UE of claim 10, wherein the first set of IMS signaling messages are associated with voice over IP or video over IP signaling services.

14. The UE of claim 10, wherein the first set of IMS signaling messages are associated with a SMS over IP service.

15. The UE of claim 10, wherein the second set of IMS signaling messages are associated with a SIP presence service, a SIP instant messaging service, or other SIP services based on the SIP event notification framework.

16. The method of claim 1, wherein establishing the second bearer is performed in response to the second set of IMS signaling messages.

17. An apparatus for implementation within a user equipment device (UE), comprising:
one or more processing elements, wherein the one or more processing elements are configured to:
establish a default bearer for first IP multimedia subsystem (IMS) signaling messages, wherein the default bearer is a dedicated IMS signaling bearer used only for IMS signaling messages, wherein the default bearer is associated with first QoS characteristics identified by a QoS class identifier (QCI) value of 5;
use the default bearer for IMS signaling messages having a first priority;
in response to second IMS signaling messages of a second priority, lower than the first priority, establish a second bearer for IMS signaling messages, wherein the second bearer is also a dedicated IMS signaling bearer used only for IMS signaling messages, wherein the second bearer is associated with second QOS characteristics identified by a value other than 5;
use the second bearer for the IMS signaling messages of the second priority.

18. The apparatus of claim 17, wherein the first IMS signaling messages are associated with voice over IP or video over IP signaling services.

19. The apparatus of claim 17, wherein the first IMS signaling messages are associated with a SMS over IP service.

20. The apparatus of claim 17, wherein the second IMS signaling messages are associated with a one or more of SIP presence service or SIP instant messaging service.

* * * * *